(12) United States Patent
Fuchida et al.

(10) Patent No.: US 10,001,669 B2
(45) Date of Patent: Jun. 19, 2018

(54) OPTICAL MEMBER, POLARIZING PLATE SET AND LIQUID CRYSTAL DISPLAY APPARATUS

(71) Applicant: NITTO DENKO CORPORATION, Ibaraki-shi, Osaka (JP)

(72) Inventors: Takehito Fuchida, Ibaraki (JP); Shouhei Maezawa, Ibaraki (JP); Hiroyuki Takemoto, Ibaraki (JP); Nao Murakami, Ibaraki (JP); Kozo Nakamura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days. days.

(21) Appl. No.: 14/391,442

(22) PCT Filed: Apr. 10, 2013

(86) PCT No.: PCT/JP2013/060785
§ 371 (c)(1),
(2) Date: Oct. 9, 2014

(87) PCT Pub. No.: WO2013/154125
PCT Pub. Date: Oct. 17, 2013

(65) Prior Publication Data
US 2015/0109561 A1 Apr. 23, 2015

(30) Foreign Application Priority Data

Apr. 13, 2012 (JP) .................. 2012-091742

(51) Int. Cl.
*G02F 1/1335* (2006.01)
*G02B 1/14* (2015.01)
(Continued)

(52) U.S. Cl.
CPC ....... *G02F 1/133536* (2013.01); *G02B 1/105* (2013.01); *G02B 1/14* (2015.01);
(Continued)

(58) Field of Classification Search
None
See application file for complete search history.

(56) References Cited

U.S. PATENT DOCUMENTS 6,778,235 B2 8/2004 Takahashi et al.
6,846,089 B2 1/2005 Stevenson et al.
(Continued)

FOREIGN PATENT DOCUMENTS

CN 1475844 A 2/2004
CN 1530713 A 9/2004
(Continued)

OTHER PUBLICATIONS

International Search Report dated Jul. 16, 2013, issued in corresponding application No. PCT/JP2013/060785.
(Continued)

*Primary Examiner* — Richard Kim
(74) *Attorney, Agent, or Firm* — Westerman, Hattori, Daniels & Adrian, LLP (57) ABSTRACT

There is provided an optical member that suppresses the occurrence of moire, and can realize a liquid crystal display apparatus that is excellent in mechanical strength and has high brightness. An optical member according to an embodiment of the present invention includes a polarizing plate, a light diffusion layer, a reflective polarizer, and a prism sheet in the stated order.

5 Claims, 5 Drawing Sheets

(51) Int. Cl.
*G02B 1/10* (2015.01)
*G02B 5/02* (2006.01)
*G02B 5/30* (2006.01)
*G02B 27/28* (2006.01)
*G02B 5/04* (2006.01)

(52) U.S. Cl.
CPC ............. *G02B 5/02* (2013.01); *G02B 5/0231* (2013.01); *G02B 5/3025* (2013.01); *G02B 5/3083* (2013.01); *G02B 27/286* (2013.01); *G02F 1/133504* (2013.01); *G02B 5/045* (2013.01); *G02B 5/3041* (2013.01); *G02F 2001/133507* (2013.01); *G02F 2001/133567* (2013.01); *G02F 2001/133607* (2013.01)

(56) References Cited

U.S. PATENT DOCUMENTS

| | | | |
|---|---|---|---|
| 7,106,395 B2 | 9/2006 | Maeda | |
| 7,133,091 B2 | 11/2006 | Ohsumi | |
| 7,349,039 B2* | 3/2008 | Lee | G02B 6/0053 349/57 |
| 7,432,999 B2 | 10/2008 | Hiraishi | |
| 8,253,888 B2 | 8/2012 | Itou et al. | |
| 8,339,548 B2 | 12/2012 | Yamakita et al. | |
| 9,110,242 B2 | 8/2015 | Miyatake et al. | |
| 9,158,156 B2 | 10/2015 | Miyatake et al. | |
| 2001/0003472 A1 | 6/2001 | Hiraishi | |
| 2003/0142250 A1* | 7/2003 | Kawahara | G02B 5/305 349/96 |
| 2003/0156233 A1 | 8/2003 | Ohsumi | |
| 2003/0160917 A1 | 8/2003 | Takahashi et al. | |
| 2004/0061812 A1 | 4/2004 | Maeda | |
| 2004/0228106 A1 | 11/2004 | Stevenson et al. | |
| 2005/0007513 A1 | 1/2005 | Lee et al. | |
| 2005/0134963 A1 | 6/2005 | Stevenson et al. | |
| 2005/0195588 A1 | 9/2005 | Kang et al. | |
| 2006/0098456 A1 | 5/2006 | Sakamoto et al. | |
| 2008/0247192 A1* | 10/2008 | Hoshi | G02B 5/045 362/627 |
| 2008/0252826 A1 | 10/2008 | Yamakita et al. | |
| 2010/0123856 A1* | 5/2010 | Arai | G02F 1/133536 349/62 |
| 2010/0231826 A1 | 9/2010 | Itou et al. | |
| 2010/0231831 A1 | 9/2010 | Miyatake et al. | |
| 2010/0297406 A1* | 11/2010 | Schaffer | C08F 293/005 428/195.1 |
| 2011/0304797 A1 | 12/2011 | Murata et al. | |
| 2012/0229735 A1 | 9/2012 | Miyatake et al. | |
| 2015/0195588 A1 | 7/2015 | Park et al. | |

FOREIGN PATENT DOCUMENTS

| | | |
|---|---|---|
| CN | 1773349 A | 5/2006 |
| CN | 1791829 A | 6/2006 |
| EP | 1625444 A1 | 2/2006 |
| JP | 11-295714 A | 10/1999 |
| JP | 2001-51268 A | 2/2001 |
| JP | 2001-166302 A | 6/2001 |
| JP | 2004-54034 A | 2/2004 |
| JP | 2006-99975 A | 4/2006 |
| JP | 2006-138975 A | 6/2006 |
| JP | 2007-502010 A | 2/2007 |
| JP | 2008-139819 A | 6/2008 |
| JP | 2008-261961 A | 10/2008 |
| JP | 2009-031746 A | 2/2009 |
| JP | 2009-080945 A | 4/2009 |
| JP | 2010-217288 A | 9/2010 |
| JP | 2011-102848 A | 5/2011 |
| JP | 2011-123476 A | 6/2011 |
| KR | 10-2004-0010272 A | 1/2004 |
| KR | 10-2006-0010808 A | 2/2006 |
| KR | 10-2006-0052635 A | 5/2006 |
| TW | 200540520 A | 3/1994 |
| TW | 1228196 B | 2/2005 |
| TW | 201227075 A | 7/2012 |
| WO | 2004/104679 A1 | 12/2004 |
| WO | 2010/137376 A1 | 12/2010 |

OTHER PUBLICATIONS

The Explanation of Circumstances Concerning Accelerated Examination dated Aug. 28, 2014, filed in corresponding Japanese patent application No. 2013-081050.
English Translation of the Explanation of Circumstances Concerning Accelerated Examination dated Aug. 28, 2014, filed in corresponding Japanese patent application No. 2013-081050. (4 pages).
Japanese Office Action dated Oct. 22, 2014, issued in corresponding JP application No. 2013-081050 with English translation (9 pages).
Japanese Office Action dated Feb. 25, 2015, issued in corresponding JP Patent Application No. 2013-081050 with English trnslation (9 pages).
Office Action dated Oct. 2, 2015, issued in counterpart Taiwanese Patent Application No. 102113157, with English translation (9 pages).
Office Action dated Dec. 2, 2015, issued in couterpart Chinese Application No. 201380019384.5, with English translation (18 pages).
Office Action dated Jun. 12, 2017, issued in Chinese Patent Application No. 201380019384.5 with tranlsation.
English translation of the International Search Report dated Jul. 16, 2013, issued in corresponding application No. PCT/JP2013/060785.
Korean Office Action dated Jul. 7, 2016, issued in Korean Patent Application No. 10-2016-7016603 with English translation. (14 pages).

* cited by examiner

OPTICAL MEMBER, POLARIZING PLATE SET AND LIQUID CRYSTAL DISPLAY APPARATUS

TECHNICAL FIELD

The present invention relates to an optical member, a polarizing plate set, and a liquid crystal display apparatus. More specifically, the present invention relates to an optical member including a polarizing plate, a light diffusion layer, a reflective polarizer, and a prism sheet, and a polarizing plate set and a liquid crystal display apparatus each using the optical member.

BACKGROUND ART

In recent years, as a display, a liquid crystal display apparatus using a surface light source device has been remarkably widespread. In a liquid crystal display apparatus including an edge light-type surface light source device, for example, light emitted from a light source enters a light guide plate, and propagates through an inside of the light guide plate while repeating a total reflection on a light output surface (liquid crystal cell-side surface) of the light guide plate and a back surface thereof. A part of the light that propagates through the inside of the light guide plate allows a traveling direction thereof to be changed by a light scattering body or the like, which is provided on the back surface of the light guide plate or the like, and is output from the light output surface to an outside of the light guide plate. Such light output from the light output surface of the light guide plate is diffused and condensed by various optical sheets such as a diffusion sheet, a prism sheet, a brightness enhancement film, or the like, and thereafter, the light enters a liquid crystal display panel in which polarizing plates are arranged on both sides of a liquid crystal cell. Liquid crystal molecules of a liquid crystal layer of the liquid crystal cell are driven for each of pixels to control transmission and absorption of the incident light. As a result, an image is displayed.

Typically, the above-mentioned prism sheet is fitted into a casing of the surface light source device, and is provided close to the light output surface of the light guide plate. In a liquid crystal display apparatus using such a surface light source device as described above, the prism sheet and the light guide plate are rubbed against each other when installing the prism sheet or under an actual usage environment, and the light guide plate is flawed in some cases. In order to solve such a problem, a technology for integrating the prism sheet with a light source-side polarizing plate is proposed (Patent Literature 1). However, a liquid crystal display apparatus using such polarizing plate with which the prism sheet is integrated has a problem of being dark because front brightness is insufficient.

Further, a liquid crystal display apparatus using such surface light source device as described above involves a problem in that moire occurs owing to the regular structure of the prism sheet. To solve such problem, it has been proposed that the prism sheet be provided with a light diffusion layer. However, the use of a light diffusion layer having light diffusibility strong enough to dissolve the moire causes a problem in that the brightness of the liquid crystal display apparatus reduces. For example, Patent Literature 2 discloses (1) an optical member obtained by laminating a light-diffusible pressure-sensitive adhesive on one side of a polarizing plate and laminating a sheet member having a prism shape on the other side thereof, and (2) an optical member obtained by laminating a polarizing plate and a sheet member having a prism shape through a light-diffusible pressure-sensitive adhesive. Although the optical member of the item (1) can suppress the occurrence of the moire, the brightness and front contrast of the liquid crystal display apparatus become insufficient. The optical member of the item (2) cannot suppress the occurrence of the moire and makes the brightness of the liquid crystal display apparatus insufficient.

CITATION LIST

Patent Literature

[PTL 1] JP 11-295714 A
[PTL 2] JP 2011-123476 A

SUMMARY OF INVENTION

Technical Problem

The present invention has been made to solve the above-mentioned problems, and an object of the present invention is to provide an optical member that suppresses the occurrence of moire, and can realize a liquid crystal display apparatus that is excellent in mechanical strength and has high brightness.

Solution to Problem

An optical member according to an embodiment of the present invention includes a polarizing plate, a light diffusion layer, a reflective polarizer, and a prism sheet in the stated order.

In one embodiment of the invention, the prism sheet includes an array of a plurality of columnar unit prisms that are convex toward a side opposite to the reflective polarizer.

In one embodiment of the invention, a distance between the light diffusion layer and a prism portion of the prism sheet is from 75 µm to 250 µm.

In one embodiment of the invention, the light diffusion layer has a haze value of from 50% to 95%.

In one embodiment of the invention, the light diffusion layer includes a light diffusion pressure-sensitive adhesive.

According to another aspect of the present invention, there is provided a polarizing plate set. The polarizing plate set includes the above-described optical member to be used as a back surface side polarizing plate; and a viewer side polarizing plate.

According to another aspect of the present invention, there is provided a liquid crystal display apparatus. The liquid crystal display apparatus includes a liquid crystal cell; a polarizing plate arranged on a viewer side of the liquid crystal cell; and the above-described optical member arranged on a side of the liquid crystal cell opposite to the viewer side.

Advantageous Effects of Invention

According to one embodiment of the present invention, in the optical member including the polarizing plate, the light diffusion layer, the reflective polarizer, and the prism sheet, the reflective polarizer is arranged between the light diffusion layer and the prism sheet. Thus, the optical member suppresses the occurrence of moire, and can realize a liquid crystal display apparatus having high brightness. Further, the polarizing plate and the prism sheet are integrated, and hence the optical member of the present invention can realize a liquid crystal display apparatus excellent in mechanical strength.

DESCRIPTION OF EMBODIMENTS

Hereinafter, preferred embodiments of the present invention are described with reference to the drawings. However, the present invention is not limited to these embodiments.

A. Entire Construction of Optical Member

Figure 1:
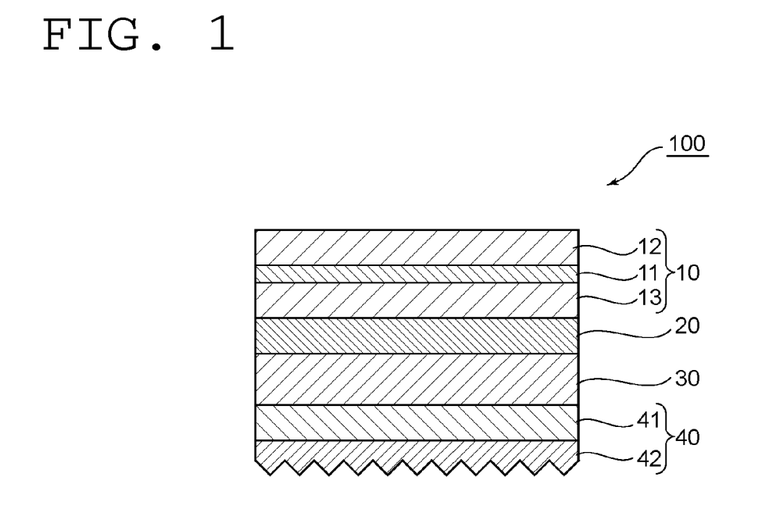
FIG. 1 is a schematic sectional view illustrating an optical member according to one embodiment of the present invention.

FIG. 1 is a schematic sectional view illustrating an optical member according to one embodiment of the present invention. An optical member 100 includes a polarizing plate 10, a light diffusion layer 20, a reflective polarizer 30, and a prism sheet 40 in the stated order. The polarizing plate 10 typically includes a polarizer 11, a protective layer 12 arranged on one side of the polarizer 11, and a protective layer 13 arranged on the other side of the polarizer 11. The prism sheet 40 typically includes a base portion 41 and a prism portion 42. The polarizing plate and the prism sheet are integrated as described above, and hence an air layer between the prism sheet and the polarizing plate can be excluded, which can contribute to the thinning of a liquid crystal display apparatus. The thinning of the liquid crystal display apparatus has a high commercial value because the thinning widens the selection of design. Further, the polarizing plate and the prism sheet are integrated, and hence a flaw in the prism sheet due to rubbing upon attachment of the prism sheet to a surface light source device (a backlight unit, substantially a light guide plate) can be avoided. Accordingly, a liquid crystal display apparatus that can prevent the cloudiness of its display resulting from such flaw and is excellent in mechanical strength can be obtained. In addition, according to this embodiment, the reflective polarizer 30 is arranged between the light diffusion layer 20 and the prism sheet 40, and a predetermined distance is provided between the light diffusion layer 20 and the prism sheet 40, and hence a liquid crystal display apparatus that suppresses the occurrence of moire and has high brightness can be realized. In addition, according to this embodiment, the light diffusion layer 20 is arranged on the side of the reflective polarizer 30 opposite to the prism sheet 40 (when the optical member is used in a liquid crystal display apparatus, the layer is arranged on a side opposite to the backlight unit of the liquid crystal display apparatus), and hence the brightness of the liquid crystal display apparatus can be improved. Specifically, in the reflective polarizer, the utilization efficiency of front incident light is higher than that of incident light in an oblique direction. The light diffusion layer 20 is arranged on the side of the reflective polarizer 30 opposite to the prism sheet 40, and hence the quantity of the front incident light can be increased. As a result, the utilization efficiency of the light can be additionally improved and hence the brightness can be improved. Hereinafter, each constituent of the optical member is described in detail.

B. Polarizing Plate

The polarizing plate 10 typically includes the polarizer 11, the protective layer 12 arranged on one side of the polarizer 11, and the protective layer 13 arranged on the other side of the polarizer 11. The polarizer is typically an absorption-type polarizer.

B-1. Polarizer

The transmittance of the above-mentioned absorption-type polarizer (also referred to as a single axis transmittance) at the wavelength of 589 nm is preferably 41% or more, more preferably 42% or more. Note that, the theoretical upper limit of the single axis transmittance is 50%. In addition, polarization degree thereof is preferably from 99.5% to 100%, more preferably from 99.9% to 100%. As long as the single axis transmittance and the polarization degree fall within the range, contrast in the front direction can be further higher when used in the liquid crystal display apparatus.

The single axis transmittance and polarization degree described above can be measured with a spectrophotometer. A specific measurement method for the polarization degree may involve measuring parallel transmittance ($H_0$) and perpendicular transmittance ($H_{90}$) of the polarizer, and determining the polarization degree through the following expression: polarization degree (%)=$\{(H_0-H_{90})/(H_0+H_{90})\}^{1/2} \times 100$. The parallel transmittance ($H_0$) refers to a value of transmittance of a parallel-type laminated polarizer prepared by causing two identical polarizers to overlap with each other in such a manner that absorption axes thereof are parallel to each other. In addition, the perpendicular transmittance ($H_{90}$) refers to a value of a transmittance of a perpendicular-type laminated polarizer prepared by causing two identical polarizers to overlap with each other in such a manner that absorption axes thereof are perpendicular to each other. Note that, each transmittance is a Y value obtained through relative spectral responsivity correction at a two-degree field of view (C light source) in JIS Z 8701-1982.

Any appropriate polarizer may be adopted as the absorption-type polarizer depending on purpose. Examples thereof include a polarizer obtained by causing a hydrophilic polymer film such as a polyvinyl alcohol-based film, a partially formalized polyvinyl alcohol-based film, or an ethylene-vinyl acetate copolymer-based partially saponified film to absorb a dichroic substance such as iodine or a dichroic dyestuff, followed by uniaxial stretching, and a polyene-based alignment film such as a product obtained by subjecting polyvinyl alcohol to dehydration treatment or a product obtained by subjecting polyvinyl chloride to dehydrochlorination treatment. In addition, there may also be used, for example, guest-host-type E-type and O-type polarizers each including a dichroic substance and a liquid crystalline compound in which the liquid crystalline compound is aligned in a fixed direction as disclosed in, for example, U.S. Pat. No. 5,523,863, and E-type and O-type polarizers in which the lyotropic liquid crystals are aligned in a fixed direction as disclosed in, for example, U.S. Pat. No. 6,049,428.

Of such polarizers, a polarizer formed of a polyvinyl alcohol (PVA)-based film containing iodine is suitably used from the viewpoint of having a high polarization degree. The polyvinyl alcohol or a derivative thereof is used as a material for the polyvinyl alcohol-based film to be applied to the polarizer. Examples of the derivative of polyvinyl alcohol include polyvinyl formal and polyvinyl acetal as well as polyvinyl alcohol modified with, for example, an olefin such as ethylene or propylene, an unsaturated carboxylic acid such as acrylic acid, methacrylic acid, or crotonic acid, alkyl ester thereof, or acrylamide. Polyvinyl alcohol having a polymerization degree of about from 1,000 to 10,000 and a saponification degree of about from 80 mol % to 100 mol % are generally used.

The polyvinyl alcohol-based film (unstretched film) is subjected to at least uniaxial stretching treatment and iodine dyeing treatment according to conventional methods, and may further be subjected to boric acid treatment or iodine ion treatment. In addition, the polyvinyl alcohol-based film (stretched film) subjected to the treatment described above becomes a polarizer through drying according to a conventional method.

The stretching method in the uniaxial stretching treatment is not particularly limited, and any one of a wet stretching method and a dry stretching method may be adopted. As a stretching means for the dry stretching method, there is given, for example, a roll stretching method, a heating roll stretching method, or a compression stretching method. The stretching may be performed in a plurality of steps. In the stretching means, the unstretched film is generally in a heated state. A film having a thickness of about from 30 μm to 150 μm is generally used as the unstretched film. The stretching ratio of the stretched film may be appropriately set depending on purpose. However, the stretching ratio (total stretching ratio) is about from 2 times to 8 times, preferably from 3 times to 6.5 times, more preferably from 3.5 times to 6 times. The thickness of the stretched film is suitably about from 5 μm to 40 μm.

The iodine dyeing treatment is performed by immersing the polyvinyl alcohol-based film in an iodine solution containing iodine and potassium iodide. The iodine solution is generally an iodine aqueous solution, and contains iodine and potassium iodide as a dissolution aid. The concentration of iodine is preferably about from 0.01 wt % to 1 wt %, more preferably from 0.02 wt % to 0.5 wt %, and the concentration of potassium iodide is preferably about from 0.01 wt % to 10 wt %, more preferably from 0.02 wt % to 8 wt %.

In iodine dyeing treatment, the temperature of the iodine solution is generally about from 20° C. to 50° C., and is preferably from 25° C. to 40° C. Time period of the immersion falls within a range of generally about from 10 seconds to 300 seconds, and is preferably from 20 seconds to 240 seconds. In iodine dyeing treatment, through adjustment of conditions such as the concentration of the iodine solution, and the immersion temperature and time period of the immersion of polyvinyl alcohol-based film into the iodine solution, iodine content and potassium content in the polyvinyl alcohol-based film is adjusted so as to allow both to fall within a desires range. The iodine dyeing treatment may be performed at any one of the time points before the uniaxial stretching treatment, during the uniaxial stretching treatment, and after the uniaxial stretching treatment.

The boric acid treatment is performed by immersing the polyvinyl alcohol-based film in a boric acid aqueous solution. The concentration of boric acid in the boric acid aqueous solution is about from 2 wt % to 15 wt %, preferably from 3 wt % to 10 wt %. Potassium iodide, potassium ion and iodine ion may be incorporated in the boric acid aqueous solution. The concentration of potassium iodide in the boric acid aqueous solution is about from 0.5 wt % to 10 wt %, and is preferably from 1 wt % to 8 wt %. A polarizer with low coloration, that is, almost constant absorbance over approximately entire wavelength region of visible light, so-called neutral grey can be obtained with a boric acid aqueous solution containing potassium iodide.

For example, an aqueous solution obtained by incorporating iodine ion with, for example, potassium iodide is used for the iodine ion treatment. The concentration of potassium iodide is preferably about from 0.5 wt % to 10 wt %, more preferably from 1 wt % to 8 wt %. In iodine ion immersion treatment, the temperature of the aqueous solution is generally about from 15° C. to 60° C., and is preferably from 25° C. to 40° C. Time period of the immersion is generally about from 1 second to 120 seconds, and preferably falls within a range of from 3 seconds to 90 seconds. The time point of the iodine ion treatment is not particularly limited as long as the time point is before the drying step. The treatment may be performed after water washing described later.

The polyvinyl alcohol-based film (stretched film) subjected to the treatment described above may be subjected to a water washing step and a drying step according to a conventional method.

Any appropriate drying method such as natural drying, drying by blowing, or drying by heating may be adopted as the drying step. In the case of the drying by heating, for example, drying temperature thereof is typically from 20° C. to 80° C., and is preferably from 25° C. to 70° C. Time period of the drying is preferably about from 1 minute to 10 minutes. In addition, the moisture content of the polarizer after the drying is preferably from 10 wt % to 30 wt %, more preferably from 12 wt % to 28 wt %, still more preferably from 16 wt % to 25 wt %. When the moisture content is excessively high, in drying the polarizing plate, the polarization degree is liable to decrease in accordance with the drying of the polarizer. In particular, the perpendicular transmittance in a short wavelength region of 500 nm or less is increased, that is, the black display is liable to be colored with blue because of the leakage of the short wavelength light. On the contrary, when the moisture content of the polarizer is excessively small, a problem such as local uneven defect (knick defect) may easily occur.

The polarizing plate 10 is typically provided in a long shape (e.g., a roll shape) and used in the production of an optical member. In one embodiment, the polarizer has an absorption axis in its lengthwise direction. Such polarizer can be obtained by a production method that has been conventionally employed in the industry (e.g., such production method as described above). In another embodiment, the polarizer has the absorption axis in its widthwise direction. The optical member of the present invention can be produced by laminating such polarizer together with a reflective polarizer of a linearly polarized light separation type having a reflection axis in its widthwise direction according to the so-called roll-to-roll process, and hence the efficiency of the production can be significantly improved.

B-2. Protective Layer

The protective layer is formed of any appropriate film that may be used as a protective film for the polarizer. Specific examples of a material serving as a main component of the film include transparent resins such as a cellulose-based resin such as triacetylcellulose (TAC), a polyester-based resin, a polyvinyl alcohol-based resin, a polycarbonate-based resin, a polyimide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof is a thermosetting resin or a UV-curable resin such as a (meth)acrylic resin, a urethane-based resin, a (meth)acrylic urethane-based resin, an epoxy-based resin, or a silicone-based resin. Still another example thereof is a glassy polymer such as a siloxane-based polymer. Further, a polymer film described in JP 2001-343529 A (WO 01/37007 A1) may also be used. As a material for the film, for example, there may be used a resin composition containing a thermoplastic resin having a substituted or unsubstituted imide group in a side chain and a thermoplastic resin having a substituted or unsubstituted phenyl group and a nitrile group in a side chain. An example thereof is a resin composition containing an alternate copolymer formed of isobutene and N-methylmaleimide and an acrylonitrile-styrene copolymer. The polymer film may be an extruded product of the resin composition, for example. The protective layers may be identical to or different from each other.

The thickness of each of the protective layers is preferably from 20 μm to 100 μm. Each of the protective layers may be laminated on the polarizer through an adhesion layer (specifically an adhesive layer or a pressure-sensitive adhesive layer), or may be laminated so as to be in close contact with the polarizer (without through the adhesion layer). The adhesive layer is formed of any appropriate adhesive. The adhesive is, for example, a water-soluble adhesive using a polyvinyl alcohol-based resin as a main component. The water-soluble adhesive using the polyvinyl alcohol-based resin as a main component can preferably further contain a metal compound colloid. The metal compound colloid can be such that metal compound fine particles are dispersed in a dispersion medium, and the colloid can be a colloid that electrostatically stabilizes as a result of interactive repulsion between the charges of the same kind of the fine particles to permanently have stability. The average particle diameter of the fine particles forming the metal compound colloid can be any appropriate value as long as the average particle diameter does not adversely affect the optical characteristics of the polarizer such as a polarization characteristic. The average particle diameter is preferably from 1 nm to 100 nm, more preferably from 1 nm to 50 nm. This is because the fine particles can be uniformly dispersed in the adhesive layer, its adhesion can be secured, and a knick can be suppressed. It should be noted that the term "knick" refers to a local uneven defect that occurs at an interface between the polarizer and each of the protective layers.

C. Light Diffusion Layer

The light diffusion layer 20 may be formed of a light diffusion element or may be formed of a light diffusion pressure-sensitive adhesive. The light diffusion element includes a matrix and light-diffusible fine particles dispersed in the matrix. The matrix of the light diffusion pressure-sensitive adhesive is formed of a pressure-sensitive adhesive.

The light diffusion performance of the light diffusion layer can be represented by, for example, a haze value and/or a light diffusion half-value angle. The haze value of the light diffusion layer is preferably from 50% to 95%, more preferably from 60% to 95%, still more preferably from 70% to 95%. Setting the haze value within the range provides desired diffusion performance and hence can satisfactorily suppress the occurrence of the moire. The light diffusion half-value angle of the light diffusion layer is preferably from 5° to 50°, more preferably from 10° to 30°. The light diffusion performance of the light diffusion layer can be controlled by adjusting, for example, a constituent material for the matrix (the pressure-sensitive adhesive in the case of the light diffusion pressure-sensitive adhesive), and a constituent material for, and the volume-average particle diameter and compounding amount of, the light-diffusible fine particles.

The total light transmittance of the light diffusion layer is preferably 75% or more, more preferably 80% or more, still more preferably 85% or more.

The thickness of the light diffusion layer can be appropriately adjusted depending on, for example, its construction and diffusion performance. For example, when the light diffusion layer is formed of the light diffusion element, the thickness is preferably from 5 μm to 200 μm. In addition, for example, when the light diffusion layer is formed of the light diffusion pressure-sensitive adhesive, the thickness is preferably from 5 μm to 100 μm.

As described above, the light diffusion layer may be formed of the light diffusion element or may be formed of the light diffusion pressure-sensitive adhesive. When the light diffusion layer is formed of the light diffusion element, the light diffusion layer includes the matrix and the light-diffusible fine particles dispersed in the matrix. The matrix is formed of, for example, an ionizing radiation-curable resin. An ionizing radiation is, for example, UV light, visible light, an infrared ray, or an electron beam. Of those, the UV light is preferred. Therefore, the matrix is preferably formed of a UV-curable resin. Examples of the UV-curable resin include an acrylic resin, an aliphatic (e.g., polyolefin) resin, and a urethane-based resin. The light-diffusible fine particles are as described later for an embodiment in which the light diffusion layer is formed of the light diffusion pressure-sensitive adhesive.

The light diffusion layer is preferably formed of the light diffusion pressure-sensitive adhesive. The adoption of such construction eliminates the need for an adhesion layer (an adhesive layer or a pressure-sensitive adhesive layer) needed in the case where the light diffusion layer is formed of the light diffusion element. Accordingly, the adoption can contribute to the thinning of the optical member (consequently, a liquid crystal display apparatus) and eliminate the adverse effects of the adhesion layer on the display characteristics of the liquid crystal display apparatus. In this case, the light diffusion layer contains a pressure-sensitive adhesive and light-diffusible fine particles dispersed in the pressure-sensitive adhesive. Any appropriate pressure-sensitive adhesive can be used as the pressure-sensitive adhesive. Specific examples thereof include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. Of those, the acrylic pressure-sensitive adhesive is preferred. The use of the acrylic pressure-sensitive adhesive can provide a light diffusion layer excellent in heat resistance and transparency. One kind of the pressure-sensitive adhesives may be used alone, or two or more kinds thereof may be used in combination.

Any appropriate pressure-sensitive adhesive can be used as the acrylic pressure-sensitive adhesive. The glass transition temperature of the acrylic pressure-sensitive adhesive is preferably from −60° C. to −10° C., more preferably from −55° C. to −15° C. The weight-average molecular weight of the acrylic pressure-sensitive adhesive is preferably from 200,000 to 2,000,000, more preferably from 250,000 to 1,800,000. The use of the acrylic pressure-sensitive adhesive having such characteristics can provide appropriate pressure-sensitive adhesiveness. The refractive index of the acrylic pressure-sensitive adhesive is preferably from 1.40 to 1.65, more preferably from 1.45 to 1.60.

The acrylic pressure-sensitive adhesive is typically obtained by polymerizing a main monomer that provides pressure-sensitive adhesiveness, a comonomer that provides cohesiveness, and a functional group-containing monomer serving as a cross-linking point while providing pressure-sensitive adhesiveness. The acrylic pressure-sensitive adhesive having such characteristics can be synthesized by any appropriate method, and can be synthesized with reference to, for example, the "Chemistry and application of adhesion/pressure-sensitive adhesion" by Katsuhiko Nakamae published by Dainippon Tosho Publishing Co., Ltd.

The content of the pressure-sensitive adhesive in the light diffusion layer is preferably from 50 wt % to 99.7 wt %, more preferably from 52 wt % to 97 wt %.

Any appropriate particles can be used as the light-diffusible fine particles. Specific examples thereof include inorganic fine particles and polymer fine particles. The light-diffusible fine particles are preferably the polymer fine particles. A material for the polymer fine particles is, for example, a silicone resin, a methacrylic resin (such as polymethyl methacrylate), a polystyrene resin, a polyurethane resin, or a melamine resin. Those resins can each provide a light diffusion layer excellent in diffusion performance because the resins each have excellent dispersibility in the pressure-sensitive adhesive and an appropriate refractive index difference from the pressure-sensitive adhesive. Of those, the silicone resin or the polymethyl methacrylate is preferred. The shape of each of the light-diffusible fine particles can be, for example, a true spherical shape, a flat shape, or an amorphous shape. One kind of the light-diffusible fine particles may be used alone, or two or more kinds thereof may be used in combination.

The volume-average particle diameter of the light-diffusible fine particles is preferably from 1 μm to 10 μm, more preferably from 1.5 μm to 6 μm. Setting the volume-average particle diameter within the range can provide a light diffusion layer having excellent light diffusion performance. The volume-average particle diameter can be measured with, for example, an ultracentrifugal automatic particle size distribution-measuring apparatus.

The refractive index of each of the light-diffusible fine particles is preferably from 1.30 to 1.70, more preferably from 1.40 to 1.65.

The absolute value of a refractive index difference between each of the light-diffusible fine particles and the matrix (typically the ionizing radiation-curable resin or the pressure-sensitive adhesive) is preferably more than 0 and 0.2 or less, more preferably more than 0 and 0.15 or less, still more preferably from 0.01 to 0.13.

The content of the light-diffusible fine particles in the light diffusion layer is preferably from 0.3 wt % to 50 wt %, more preferably from 3 wt % to 48 wt %. Setting the compounding amount of the light-diffusible fine particles within the range can provide a light diffusion layer having excellent light diffusion performance.

The light diffusion layer may contain any appropriate additive. Examples of the additive include an antistatic agent and an antioxidant.

The light diffusion layer 20 is attached to the polarizing plate 10 through any appropriate adhesion layer (such as an adhesive layer or a pressure-sensitive adhesive layer: not shown). In the case where the light diffusion layer is formed of the light diffusion pressure-sensitive adhesive, the adhesion layer can be omitted. That is, in this case, the polarizing plate 10 and the reflective polarizer 30 are attached to each other through the light diffusion pressure-sensitive adhesive 20.

D. Reflective Polarizer

The reflective polarizer 30 has a function of transmitting polarized light in a specific polarized state (polarization direction) and reflecting light in a polarized state other than the foregoing. The reflective polarizer 30 may be of a linearly polarized light separation type or may be of a circularly polarized light separation type. Hereinafter, description is given by taking the reflective polarizer of the linearly polarized light separation type as an example. It should be noted that the reflective polarizer of the circularly polarized light separation type is, for example, a laminate of a film obtained by fixing a cholesteric liquid crystal and a λ/4 plate.

Figure 2:
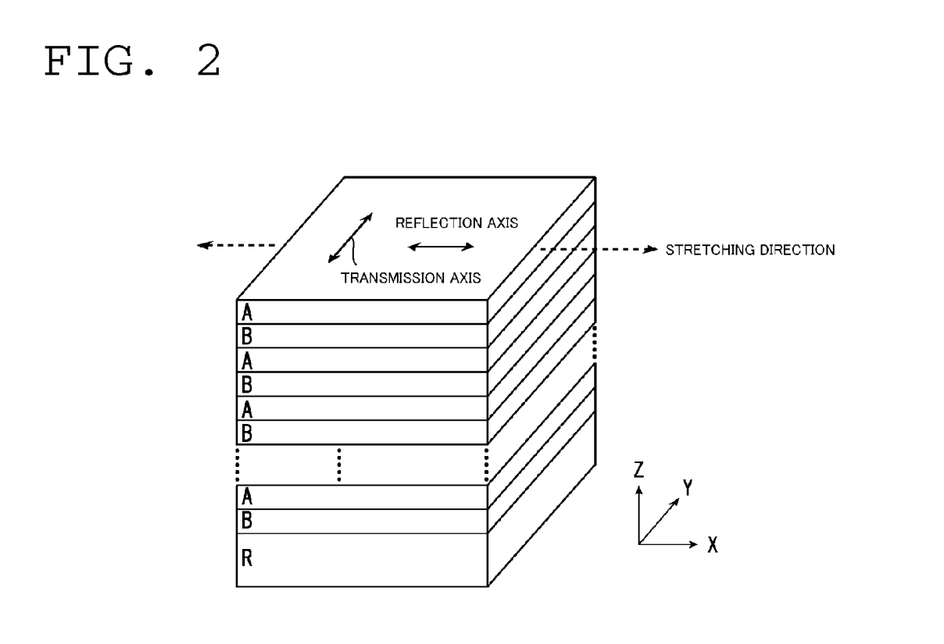
FIG. 2 is a schematic perspective view of an example of a reflective polarizer that can be used in the optical member of the present invention.

FIG. 2 is a schematic perspective view of an example of a reflective polarizer. The reflective polarizer is a multilayer laminate obtained by alternately laminating a layer A having birefringence and a layer B substantially free of birefringence. For example, the total number of the layers of such multilayer laminate can be from 50 to 1,000. In the illustrated example, a refractive index nx in the x-axis direction of the A layer is larger than a refractive index ny in the y-axis direction thereof, and a refractive index nx in the x-axis direction of the B layer and a refractive index ny in the y-axis direction thereof are substantially equal to each other. Therefore, a refractive index difference between the A layer and the B layer is large in the x-axis direction, and is substantially zero in the y-axis direction. As a result, the x-axis direction serves as a reflection axis and the v-axis direction serves as a transmission axis. The refractive index difference between the A layer and the B layer in the x-axis direction is preferably from 0.2 to 0.3. It should be noted that the x-axis direction corresponds to the stretching direction of the reflective polarizer in a production method to be described later.

The A layer is preferably formed of a material that expresses birefringence when stretched. Typical examples of such material include naphthalene dicarboxylic acid polyester (such as polyethylenenaphthalate), polycarbonate, and an acrylic resin (such as polymethyl methacrylate). Of those, the polyethylene naphthalate is preferred. The B layer is preferably formed of a material that is substantially free of expressing birefringence even when stretched. Such material is typically, for example, the copolyester of naphthalene dicarboxylic acid and terephthalic acid.

The reflective polarizer transmits light having a first polarization direction (such as a p-wave) and reflects light having a second polarization direction perpendicular to the first polarization direction (such as an s-wave) at an interface between the A layer and the B layer. Part of the reflected light passes as light having the first polarization direction through the interface between the A layer and the B layer, and the other part thereof is reflected as light having the second polarization direction at the interface. Such reflection and transmission are repeated many times in the reflective polarizer, and hence the utilization efficiency of light can be improved.

In one embodiment, the reflective polarizer may include a reflective layer R as the outermost layer on a side opposite to the polarizing plate 10 as illustrated in FIG. 2. Light that has finally returned to the outermost portion of the reflective polarizer without being utilized can be additionally utilized by providing the reflective layer R, and hence the utilization efficiency of the light can be additionally improved. The reflective layer R typically expresses a reflecting function by virtue of the multilayer structure of a polyester resin layer.

The total thickness of the reflective polarizer can be appropriately set depending on, for example, purposes and the total number of the layers in the reflective polarizer. The total thickness of the reflective polarizer is preferably from 10 μm to 150 μm. When the total thickness falls within such range, a distance between the light diffusion layer and the prism portion of the prism sheet can be caused to fall within a desired range. As a result, a liquid crystal display apparatus that suppresses the occurrence of the moire and has high brightness can be realized.

In one embodiment, in the optical member 100, the reflective polarizer 30 is arranged so as to transmit light having a polarization direction parallel to the transmission axis of the polarizing plate 10. That is, the reflective polarizer 30 is arranged so that its transmission axis may be in a direction approximately parallel to the direction of the transmission axis of the polarizing plate 10. With such construction, light to be absorbed by the polarizing plate 10 can be recycled, the utilization efficiency can be additionally improved, and the brightness can be improved.

The reflective polarizer can be typically produced by combining co-extrusion and lateral stretching. The co-extrusion can be performed by any appropriate system. For example, the system may be a feed block system or may be a multi-manifold system. For example, a material constituting the A layer and a material constituting the B layer are extruded in a feed block, and are then formed into a plurality of layers with a multiplier. It should be noted that such apparatus for forming the materials into a plurality of layers is known to one skilled in the art. Next, the resultant long multilayer laminate is typically stretched in a direction (TD) perpendicular to its conveying direction. The material constituting the A layer (such as polyethylene naphthalate) is increased in refractive index only in the stretching direction by the lateral stretching, and as a result, expresses birefringence. The material constituting the B layer (such as the copolyester of naphthalene dicarboxylic acid and terephthalic acid) is not increased in refractive index in any direction even by the lateral stretching. As a result, a reflective polarizer having a reflection axis in the stretching direction (TD) and having a transmission axis in the conveying direction (MD) can be obtained (the TD corresponds to the x-axis direction of FIG. 2 and the MD corresponds to the y-axis direction thereof). It should be noted that a stretching operation can be performed with any appropriate apparatus.

A polarizer described in, for example, JP 9-507308 A may be used as the reflective polarizer.

A commercial product may be used as it is as the reflective polarizer, or the commercial product may be subjected to secondary processing (such as stretching) before use. The commercial product is, for example, a product available under the trade name "DBEF" from 3M Company or a product available under the trade name "APF" from 3M Company.

The reflective polarizer 30 is attached to the light diffusion layer 20 through any appropriate adhesion layer (such as an adhesive layer or a pressure-sensitive adhesive layer: not shown). When the light diffusion layer is formed of the light diffusion pressure-sensitive adhesive, the adhesion layer can be omitted.

E. Prism Sheet

The prism sheet 40 is arranged on the side of the reflective polarizer 30 opposite to the light diffusion layer 20. The prism sheet 40 typically includes the base portion 41 and the prism portion 42. The distance between the light diffusion layer 20 and the prism portion 42 can be controlled by adjusting the thickness of the base portion 41. It should be noted that in this embodiment, the base portion 41 is not necessarily needed to be provided because the reflective polarizer 30 can function as a base portion for supporting the prism portion 42. In this case, the distance between the light diffusion layer 20 and the prism portion 42 can be controlled by adjusting the thickness of the reflective polarizer 30. When the optical member of the present invention is arranged on the backlight side of a liquid crystal display apparatus, the prism sheet 40 guides polarized light, which has been emitted from the light guide plate of the backlight unit of the apparatus, as polarized light having the maximum intensity in an approximately normal direction of the liquid crystal display apparatus to the polarizing plate 10 through the reflective polarizer 30 and the light diffusion layer 20 by means of, for example, total reflection in the prism portion 42 while maintaining the polarized state of the light. It should be noted that the term "approximately normal direction" comprehends a direction at a predetermined angle with respect to a normal direction, e.g., a direction at an angle in the range of ±10° with respect to the normal direction.

The prism sheet 40 is attached to the reflective polarizer 30 through any appropriate adhesion layer (such as an adhesive layer or a pressure-sensitive adhesive layer: not shown).

E-1. Prism Portion

Figure 3:
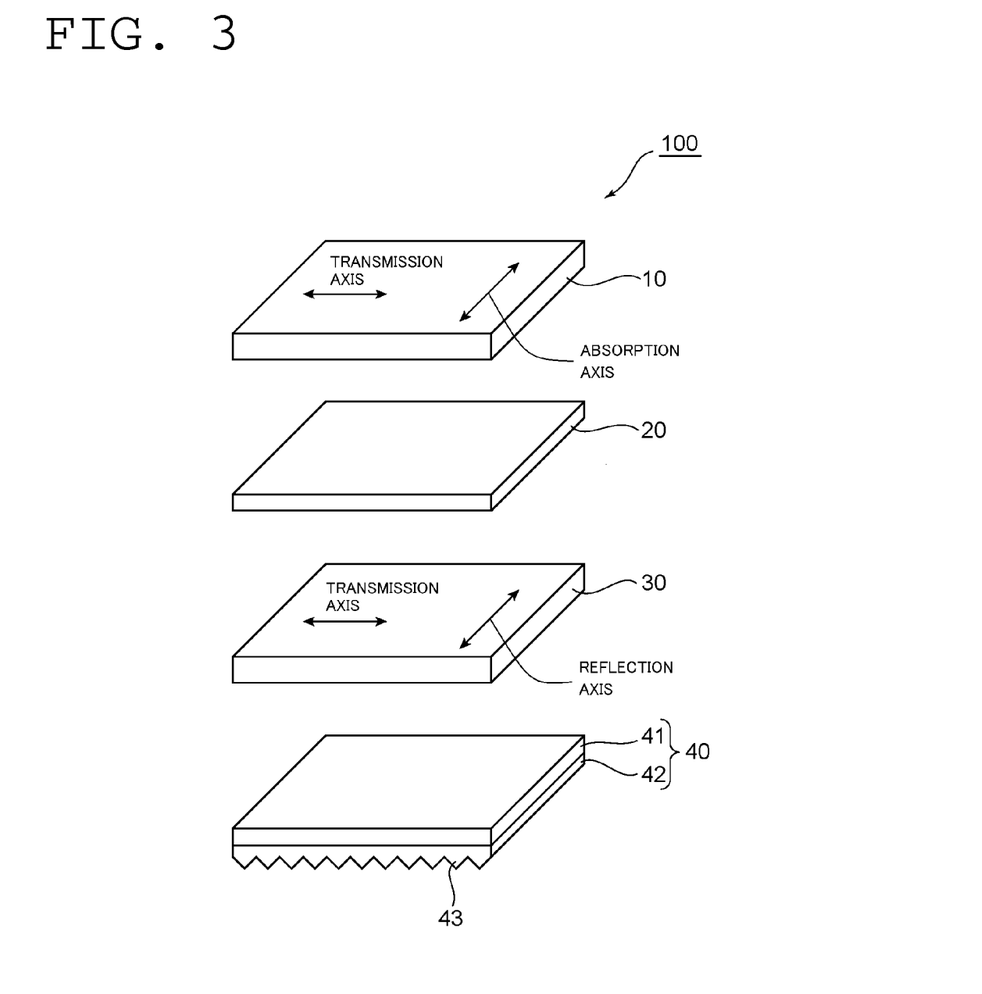
FIG. 3 is an exploded perspective view of the optical member of FIG. 1.

In one embodiment, as illustrated in each of FIGS. 1 and 3, the prism sheet 40 (substantially the prism portion 42) includes an array of a plurality of unit prisms 43, which are convex toward a side opposite to the reflective polarizer 30, in a parallel manner. Each of the unit prisms 43 is preferably columnar, and its lengthwise direction (ridge line direction) is directed toward a direction approximately perpendicular to the transmission axis of the polarizing plate 10 and the transmission axis of the reflective polarizer 30. Note that, in this specification, the expressions "substantially perpendicular" and "approximately perpendicular" include a case where an angle formed by two directions is 90°±10°, preferably 90°±7°, more preferably 90°±5°. The expressions "substantially parallel" and "approximately parallel" include a case where an angle formed by two directions is 0°±10°, preferably 0°±7°, more preferably 0°±5°. Moreover, in this specification, such a simple expression "perpendicular" or "parallel" can include a substantially perpendicular state or a substantially parallel state. It should be noted that the prism sheet 40 may be arranged so that the ridge line direction of each of the unit prisms 43, and each of the transmission axis of the polarizing plate 10 and the transmission axis of the reflective polarizer 30 may form a predetermined angle (the so-called oblique placement). The adoption of such construction can prevent the occurrence of the moire in an additionally satisfactory manner in some cases. The range of the oblique placement is preferably 20° or less, more preferably 15° or less.

Any appropriate construction can be adopted as the shape of each of the unit prisms 43 as long as the effects of the present invention are obtained. The shape of a section of each of the unit prisms 43 parallel to its arrangement direction and parallel to its thickness direction may be a triangular shape or may be any other shape (e.g., such a shape that one of, or each of both, the inclined planes of a triangle has a plurality of flat surfaces having different tilt angles). The triangular shape may be a shape asymmetric with respect to a straight line passing the apex of the unit prism and perpendicular to the surface of the sheet (e.g., a scalene triangle), or may be a shape symmetric with respect to the straight line (e.g., an isosceles triangle). Further, the apex of the unit prism may be of a chamfered curved surface shape, or may be of a shape whose section is a trapezoid, the shape being obtained by such cutting that its tip becomes a flat surface. Detailed shapes of the unit prisms 43 can be appropriately set depending on purposes. For example, a construction described in JP 11-84111 A can be adopted for each of the unit prisms 43.

The distance between the prism portion 42 and the light diffusion layer 20 is preferably from 75 µm to 250 µm. Securing such distance between the prism portion and the light diffusion layer can satisfactorily suppress the occurrence of the moire while maintaining the front contrast and brightness of the liquid crystal display apparatus. The distance between the prism portion 42 and the light diffusion layer 20 can be controlled by adjusting, for example, the thickness of the reflective polarizer 30, the base portion 41, and/or the adhesion layer between the reflective polarizer 30 and the prism sheet 40. It should be noted that the distance between the prism portion 42 and the light diffusion layer 20 refers to a distance between the flat surface of the prism portion 42 (surface opposite to the apices of the unit prisms 43) and a surface on the side of the light diffusion layer 20 closer to the reflective polarizer 30.

E-2. Base Portion

When the prism sheet 40 is provided with the base portion 41, the base portion 41 and the prism portion 42 may be integrally formed by, for example, subjecting a single material to extrusion, or the prism portion may be shaped on a film for the base portion. The thickness of the base portion is preferably from 25 µm to 150 µm. With such thickness, the distance between the light diffusion layer and the prism portion can be caused to fall within the desired range. Further, such thickness is preferred from the viewpoints of the handling property and strength of the prism sheet.

Any appropriate material can be adopted as a material constituting the base portion 41 depending on purposes and the construction of the prism sheet. When the prism portion is shaped on the film for the base portion, the film for the base portion is specifically, for example, a film formed of cellulose triacetate (TAC), a (meth)acrylic resin such as polymethyl methacrylate (PMMA), or a polycarbonate (PC) resin. The film is preferably an unstretched film.

When the base portion 41 and the prism portion 42 are integrally formed of a single material, the same material as a material for forming the prism portion when the prism portion is shaped on the film for the base portion can be used as the material. Examples of the material for forming the prism portion include epoxy acrylate- and urethane acrylate-based reactive resins (such as an ionizing radiation-curable resin). When the prism sheet of an integral construction is formed, a polyester resin such as PC or PET, an acrylic resin such as PMMA or MS, or an optically transparent thermoplastic resin such as cyclic polyolefin can be used.

It is preferred that the base portion 41 substantially have optical isotropy. The phrase "substantially have optical isotropy" as used herein means that a retardation value is so small as to have substantially no influences on the optical characteristics of the liquid crystal display apparatus. For example, an in-plane retardation Re of the base portion is preferably 20 nm or less, more preferably 10 nm or less. It should be noted that the in-plane retardation Re is an in-plane retardation value measured at 23° C. with light having a wavelength of 590 nm. The in-plane retardation Re is represented by the equation "Re=(nx−ny)×d." Here, nx represents a refractive index in the direction in which a refractive index becomes maximum in the plane of the optical member (i.e., a slow axis direction), ny represents a refractive index in a direction perpendicular to the slow axis in the plane (i.e., a fast axis direction), and d represents the thickness (nm) of the optical member.

Further, the photoelastic coefficient of the base portion 41 is preferably from $-10 \times 10^{-12}$ m$^2$/N to $10 \times 10^{-12}$ m$^2$/N, more preferably from $-5 \times 10^{-12}$ m$^2$/N to $5 \times 10^{-12}$ m$^2$/N, still more preferably from $-3 \times 10^{-12}$ m$^2$/N to $3 \times 10^{-12}$ m$^2$/N.

F. Retardation Layer

The optical member 100 may further have any appropriate retardation layer at any appropriate position depending on purposes (not shown). The positions at which retardation layers are arranged, the number of the layers, the birefringence (refractive index ellipsoid) of each of the layers, and the like can be appropriately selected depending on, for example, the drive mode of a liquid crystal cell and desired characteristics. The retardation layer may also serve as a protective layer for a polarizer depending on purposes. Hereinafter, a typical example of the retardation layer applicable to the optical member of the present invention is described.

For example, in the case where the optical member is used in a liquid crystal display apparatus of an IPS mode, the optical member may have a first retardation layer, which satisfies a relationship of $nx_1 > ny_1 > nz_1$, on the side of the polarizing plate 10 opposite to the light diffusion layer 20. In this case, the optical member may further have a second retardation layer, which satisfies a relationship of $nz_2 > nx_2 > ny_2$, outside the first retardation layer (on a side opposite to the polarizing plate 10). The second retardation layer may be the so-called positive C-plate that satisfies a relationship of $nz_2 > nx_2 = ny_2$. The slow axis of the first retardation layer and the slow axis of the second retardation layer may be perpendicular or parallel to each other. The axes are preferably parallel to each other in consideration of the viewing angle and productivity of the optical member.

An in-plane retardation $Re_1$ of the first retardation layer is preferably from 60 nm to 140 nm. An Nz coefficient $Nz_1$ of the first retardation layer is preferably from 1.1 to 1.7. An in-plane retardation $Re_2$ of the second retardation layer is preferably from 10 nm to 70 nm. A thickness direction retardation $Rth_2$ of the second retardation layer is preferably from −120 nm to −40 nm. The in-plane retardations Re are as defined in the foregoing. The thickness direction retardation Rth is represented by the equation "Rth={(nx+ny)/2−nz}×d." The Nz coefficient is represented by the equation "Nz=(nx−nz)/(nx−ny)." Here, nx and ny are as defined in the foregoing. nz represents a refractive index in the thickness direction of the optical member (here, the first retardation layer or the second retardation layer). It should be noted that the suffixes "1" and "2" represent the first retardation layer and the second retardation layer, respectively.

Alternatively, the first retardation layer may be a retardation layer that satisfies a relationship of $nx_1 > nz_1 > ny_1$. In this case, the second retardation layer is preferably the so-called negative C-plate that satisfies a relationship of $nx_2 = ny_2 > nz_2$. It should be noted that for example, the expression "nx=ny" as used herein comprehends not only the case where nx and ny are strictly equal to each other but also the case where nx and ny are substantially equal to each other. The purport of the phrase "substantially equal" as used herein is that the following case is also comprehended: the case where nx and ny are different from each other to the extent that the difference has no influences on the entire optical characteristics of the liquid crystal display apparatus in practical use. Therefore, the negative C-plate in this embodiment comprehends the case where the plate has biaxiality.

In addition, for example, in the case where the optical member is used in a liquid crystal display apparatus of a VA mode, the optical member may be used as a circularly polarizing plate. Specifically, the optical member may have the first retardation layer that functions as a λ/4 plate on the side of the polarizing plate 10 opposite to the light diffusion layer 20. In this case, an angle formed between the absorption axis of the polarizer and the slow axis of the first retardation layer is preferably substantially 45° or substantially 135°. Further, in this case, the liquid crystal display apparatus preferably includes a retardation layer that functions as a λ/4 plate between its liquid crystal cell and viewer side polarizing plate. The optical member may further have the second retardation layer, which satisfies a relationship of $nz_2>nx_2>ny_2$, between the polarizer and the first retardation layer. Further, when the retardation wavelength dispersion value ($Re_{cell}[450]/Re_{cell}[550]$) of the liquid crystal cell is represented by $\alpha_{cell}$ and the retardation wavelength dispersion value ($Re_1[450]/Re_1[550]$) of the first retardation layer is represented by $\alpha_1$, the ratio $\alpha_1/\alpha_{cell}$ is preferably from 0.95 to 1.02. In addition, the Nz coefficient of the first retardation layer preferably satisfies a relationship of $1.1<Nz_1\leq2.4$, and the Nz coefficient of the second retardation layer preferably satisfies a relationship of $-2\leq Nz_2\leq-0.1$.

In addition, for example, when the optical member is used in the liquid crystal display apparatus of the VA mode, the optical member may be used as a linearly polarizing plate. Specifically, the optical member may have the first retardation layer, which satisfies a relationship of $nx_1>ny_1>nz_1$, on the side of the polarizing plate 10 opposite to the light diffusion layer 20. The in-plane retardation $Re_1$ of the first retardation layer is preferably from 20 nm to 200 nm, more preferably from 30 nm to 150 nm, still more preferably from 40 nm to 100 nm. A thickness direction retardation $Rth_1$ of the first retardation layer is preferably from 100 nm to 800 nm, more preferably from 100 nm to 500 nm, still more preferably from 150 nm to 300 nm. The Nz coefficient of the first retardation layer is preferably from 1.3 to 8.0.

G. Polarizing Plate Set

The optical member of the present invention can be typically used as a polarizing plate arranged on the side of a liquid crystal display apparatus opposite to its viewer side (hereinafter sometimes referred to as "back surface side polarizing plate"). In this case, a polarizing plate set including the back surface side polarizing plate and a viewer side polarizing plate can be provided. Any appropriate polarizing plate can be adopted as the viewer side polarizing plate. The viewer side polarizing plate typically includes a polarizer (such as an absorption-type polarizer) and a protective layer arranged on at least one side of the polarizer. Those described in the section B can be used as the polarizer and the protective layer. The viewer side polarizing plate may further have any appropriate optical functional layer (such as a retardation layer, a hard coat layer, an antiglare layer, or an antireflection layer) depending on purposes. The polarizing plate set is arranged on each side of a liquid crystal cell so that the absorption axis of (the polarizer of) the viewer side polarizing plate and the absorption axis of (the polarizer of) the back surface side polarizing plate may be substantially perpendicular or parallel to each other.

H. Liquid Crystal Display Apparatus

Figure 4:
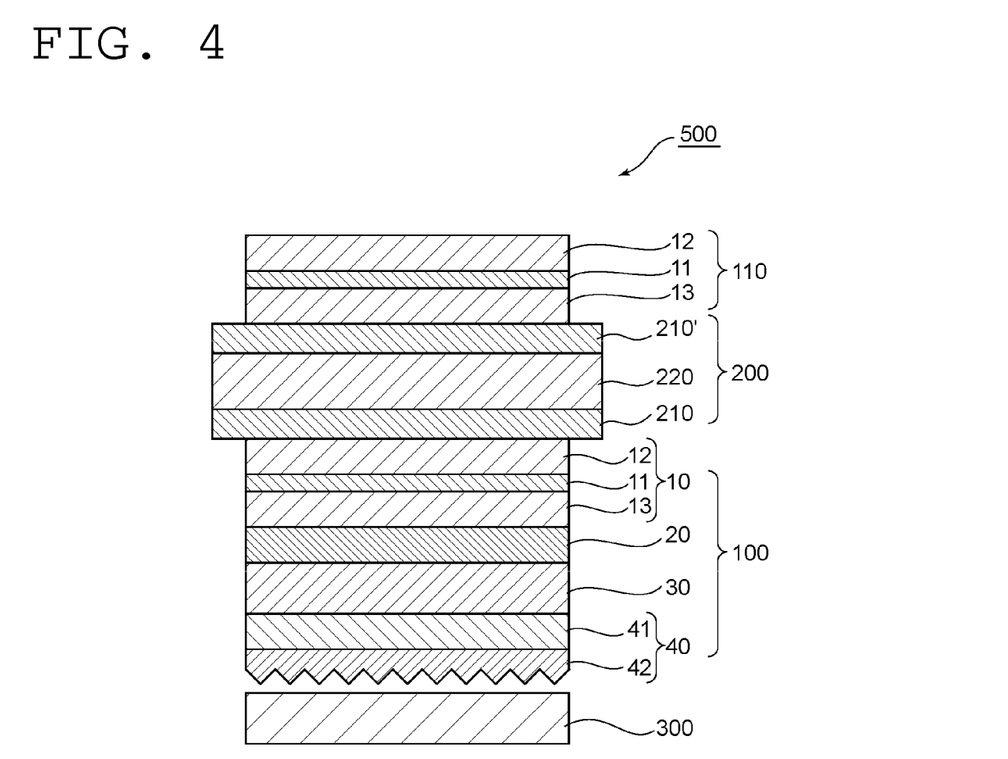
FIG. 4 is a schematic sectional view illustrating a liquid crystal display apparatus according to one embodiment of the present invention.

FIG. 4 is a schematic sectional view of a liquid crystal display apparatus according to one embodiment of the present invention. A liquid crystal display apparatus 500 includes a liquid crystal cell 200, a viewer side polarizing plate 110 arranged on the viewer side of the liquid crystal cell 200, the optical member 100 of the present invention as a back surface side polarizing plate arranged on the side of the liquid crystal cell 200 opposite to the viewer side, and a backlight unit 300 arranged on the side of the optical member 100 opposite to the liquid crystal cell 200. The optical member 100 is as described in the sections A to F. The viewer side polarizing plate is as described in the section G. In the illustrated example, the viewer side polarizing plate 110 includes the polarizer 11, the protective layer 12 arranged on one side of the polarizer, and the protective layer 13 arranged on the other side of the polarizer 11. The viewer side polarizing plate 110 and the optical member (back surface side polarizing plate) 100 are arranged so that their respective absorption axes may be substantially perpendicular or parallel to each other. Any appropriate construction can be adopted for the backlight unit 300. For example, the backlight unit 300 may be of an edge light system or may be of a direct system. When the direct system is adopted, the backlight unit 300 includes, for example, a light source, a reflective film, and a diffuser (none of which is shown). When the edge light system is adopted, the backlight unit 300 can further include a light guide plate and a light reflector (none of which is shown).

The liquid crystal cell 200 includes a pair of substrates 210 and 210' and a liquid crystal layer 220 as a display medium sandwiched between the substrates. In a general configuration, on the substrate 210' as one in the pair, a color filter and a black matrix are provided, and on the substrate 210 as the other in pair, there are provided switching elements for controlling electro-optical property of the liquid crystal, scanning lines for giving gate signals to the switching elements and signal lines for giving source signals thereto, and pixel electrodes and counter electrodes. An interval (cell gap) between the above-mentioned substrates 210 and 210' can be controlled by spacers and the like. On sides of the above-mentioned substrates 210 and 210', which are brought into contact with the liquid crystal layer 220, for example, alignment films made of polyimide or the like can be provided.

In one embodiment, the liquid crystal layer 220 includes liquid crystal molecules aligned in a homogeneous alignment in a state where an electric field is not present. The liquid crystal layer (liquid crystal cell as a result) as described above typically exhibits a three-dimensional refractive index of nx>ny=nz. Note that, in this specification, ny=nz includes not only a case where ny and nz are completely the same, but also a case where ny and nz are substantially the same.

As a typical example of a drive mode using the liquid crystal layer that exhibits the three-dimensional refractive index as described above, the in-plane switching (IPS) mode, the fringe field switching (FFS) mode, and the like are given. In the above-mentioned IPS mode, by using the electrically controlled birefringence (ECB) effect, the liquid crystal molecules aligned in the homogeneous alignment in the state where an electric field is not present are allowed to respond, for example, to an electric field (also referred to as a horizontal electric field), which is generated by the counter electrode and pixel electrode, each being formed of metal, and is parallel to the substrates. More specifically, for example, as described in "Monthly Display, July" pp. 83 to 88 (1997), published by Techno Times Co., Ltd. and "Ekisho vol. 2, No. 4" pp. 303 to 316 (1998), published by The Japanese Liquid Crystal Society, when an alignment direction of the liquid crystal cell at the time when no electric field is applied thereto and an absorption axis of a polarizer on one side are allowed to coincide with each other, and the upper and lower polarizing plates are arranged perpendicularly to each other, the normally black mode provides completely black display in the state where no electric field is present. When the electric field is present, the liquid crystal molecules perform a rotation operation while remaining parallel to the substrates so that a transmittance corresponding to a rotation angle can be obtained. Note that, the above-mentioned IPS mode includes the super in-plane switching (S-IPS) mode and the advanced super in-plane switching (AS-IPS) mode, each of which employs a V-shaped electrode, a zigzag electrode, or the like.

In the above-mentioned FFS mode, by using the electrically controlled birefringence effect, the liquid crystal molecules aligned in the homogeneous alignment in the state where no electric field is present are allowed to respond, for example, to an electric field (also referred to as a horizontal electric field), which is generated by the counter electrode and pixel electrode, each being formed of a transparent conductor, and is parallel to the substrates. Note that, the horizontal electric field in the FFS mode is also referred to as a fringe electric field. This fringe electric field can be generated by setting an interval between the counter electrode and the pixel electrode, each of which is formed of the transparent conductor, narrower than the cell gap. More specifically, for example, as described in "SID (Society for Information Display) 2001 Digest, pp. 484 to 487" and JP 2002-031812 A, when an alignment direction of the liquid crystal cell at the time when no electric field is applied thereto and an absorption axis of a polarizer on one side are allowed to coincide with each other, and the upper and lower polarizing plates are arranged perpendicularly to each other, the normally black mode provides completely black display in the state where no electric field is present. When the electric field is present, the liquid crystal molecules perform a rotation operation while remaining parallel to the substrates so that a transmittance corresponding to a rotation angle can be obtained. Note that, the above-mentioned FFS mode includes the advanced fringe field switching (A-FFS) mode and the ultra fringe field switching (U-FFS) mode, each of which employs a V-shaped electrode, a zigzag electrode, or the like.

In the drive mode (for example, the IPS mode, the FFS mode) using the liquid crystal molecules aligned in the homogeneous alignment in the state where no electric field is present, there is no oblique gray-scale inversion, and an oblique viewing angle thereof is wide, and accordingly, there is an advantage in that visibility in an oblique direction is excellent even when the surface light source directed in the front direction, which is used in the present invention, is used.

In another embodiment, the liquid crystal layer 220 includes liquid crystal molecules aligned in a homeotropic alignment in the state where no electric field is present. The liquid crystal layer (liquid crystal cell as a result) as described above typically exhibits a three-dimensional refractive index of nz>nx=ny. As a drive mode using the liquid crystal molecules aligned in the homeotropic alignment in the state where no electric field is present, for example, the vertical alignment (VA) mode is given. The VA mode includes the multi-domain VA (MVA) mode.

Figure 5A:
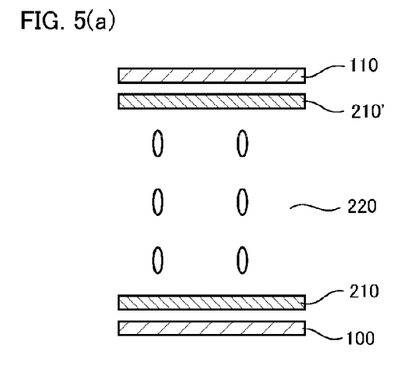
FIGS. 5(a) and 5(b) are each a schematic sectional view illustrating the aligned state of a liquid crystal molecule in a VA mode.
Figure 5B:
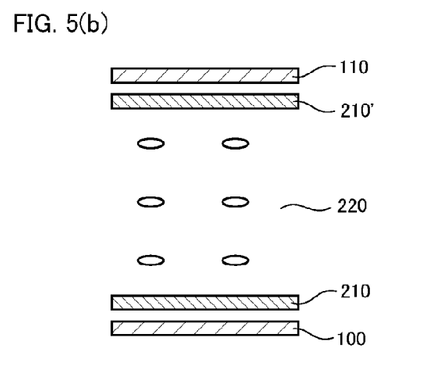

FIGS. 5(*a*) and 5(*a*) are schematic sectional views illustrating aligned states of the liquid crystal molecules in the VA mode. As illustrated in FIG. 5(*a*), the liquid crystal molecules in the VA mode are aligned, at the time when no voltage is applied thereto, approximately vertically (normal direction) on the substrates 210 and 210'. Here, the term "approximately vertical" also includes a case where an alignment vector of the liquid crystal molecules is inclined with respect to the normal direction, that is, a case where the liquid crystal molecules have a tilt angle. The tilt angle (angle from the normal line) is preferably 10° or less, more preferably 5° or less, particularly preferably 1° or less. The liquid crystal molecules have the tilt angle in such a range so that the liquid crystal display apparatus can be excellent in contrast. Moreover, moving picture display characteristics can be enhanced. The approximately vertical alignment as described above can be realized, for example, by arranging nematic liquid crystal, which has negative dielectric anisotropy, between substrates on which vertical alignment films are formed. In such a state, light of linearly polarized light, which passes through the optical member 100 and enters the liquid crystal layer 220, travels along a direction of a major axis of the liquid crystal molecules aligned approximately vertically. The birefringence is not generated substantially in a major axis direction of the liquid crystal molecules, and accordingly, the incident light travels without changing a polarization direction thereof, and is absorbed by the viewer side polarizing plate 110 having a transmission axis perpendicular to the optical member 100. In this manner, display of a dark state is obtained at the time when no voltage is applied (normally black mode). When a voltage is applied between the electrodes, the major axis of the liquid crystal molecules is aligned parallel to the substrate surfaces. The liquid crystal molecules in this state exhibit the birefringence to the light of the linearly polarized light, which passes through the optical member 100 and enters the liquid crystal layer, and the polarization state of the incident light is changed in response to an inclination of the liquid crystal molecules. The light that passes through the liquid crystal layer 220 at a time when a predetermined maximum voltage is applied becomes, for example, linearly polarized light in which a polarization direction is rotated by 90°, and accordingly, the light transmits through the viewer side polarizing plate 110, and display of a bright state is obtained. When the state where no voltage is applied is set again, the display can be returned to the display of the dark state by alignment regulating force. Moreover, the inclination of the liquid crystal molecules is controlled by changing the applied voltage, and transmission intensity of the light from the viewer side polarizing plate 110 is changed so that gray-scale display becomes possible.

EXAMPLES

The present invention is specifically described below by way of examples, but the present invention is not limited to these examples. Testing and evaluating methods in the examples are as follows. Moreover, unless particularly specified, "parts" and "%" in the examples are weight-based units.

(1) Haze Value

A light diffusion layer used in each of Examples and Comparative Examples was measured for its haze value by a method specified in JIS 7136 with a haze meter (manufactured by MURAKAMI COLOR RESEARCH LABORATORY, trade name "HN-150").

(2) Front Brightness of Liquid Crystal Display Apparatus

A liquid crystal display apparatus obtained in each of Examples and Comparative Examples was caused to perform white display on its entire screen and measured for its front brightness (unit: cd/m$^2$) with a conoscope manufactured by AUTRONIC MELCHERS.

(3) Front Contrast of Liquid Crystal Display Apparatus

The liquid crystal display apparatus obtained in each of Examples and Comparative Examples was measured for its front brightness when caused to perform white display on its entire screen and front brightness when caused to perform black display on the entire screen with a conoscope manufactured by AUTRONIC MELCHERS, and its front contrast was calculated from the equation "(front brightness at the time of white display)/(front brightness at the time of black display)."

(4) Moire

The liquid crystal display apparatus obtained in each of Examples and Comparative Examples was caused to perform white display on its entire screen, and the extent to which moire occurred was visually observed. The case where no moire could be observed even when the display apparatus was visually observed from a position distant from the apparatus by 100 mm for 1 minute while an observation angle was changed was evaluated as Symbol "⊚" (note that: the symbol means excellent), the case where no moire could be observed even when the display apparatus was visually observed from a position distant from the apparatus by 500 mm for 1 minute while the observation angle was changed was evaluated as Symbol "○" (good), and the case where the moire was able to be observed even when the display apparatus was observed from a position distant from the apparatus by 500 mm or more was evaluated as Symbol "x" (poor).

Example 1

(Production of Film for First Retardation Layer)

A commercially available polymer film [manufactured by Optes Inc., trade name: "ZeonorFilm ZF14-130 (thickness: 60 µm, glass transition temperature: 136° C.)"] whose main component was a cyclic polyolefin-based polymer was subjected to fixed-end uniaxial stretching in its width direction with a tenter stretching machine at a temperature of 158° C. in such a manner that its film width was 3.0 times as large as the original film width (lateral stretching step). The resultant film was a negative biaxial plate (three-dimensional refractive index: nx>ny>nz) having a fast axis in the conveying direction. The negative biaxial plate had an in-plane retardation of 118 nm and an Nz coefficient of 1.16.

(Production of Film for Second Retardation Layer)

A pellet-shaped resin of a styrene-maleic anhydride copolymer (manufactured by Nova Chemicals Japan Ltd., product name: "DYLARK D232") was extruded with a single screw extruder and a T die at 270° C., and the resultant sheet-shaped molten resin was cooled with a cooling drum to obtain a film having a thickness of 100 µm. The film was subjected to free-end uniaxial stretching in the conveying direction with a roll stretching machine at a temperature of 130° C. and a stretching ratio of 1.5 times to obtain a retardation film having a fast axis in the conveying direction (longitudinal stretching step). The resultant film was subjected to fixed-end uniaxial stretching in its width direction with a tenter stretching machine at a temperature of 135° C. in such a manner that its film width was 1.2 times as large as the film width after the longitudinal stretching, thereby obtaining a biaxially stretched film having a thickness of 50 µm (lateral stretching step). The resultant film was a positive biaxial plate (three-dimensional refractive index: nz>nx>ny) having a fast axis in the conveying direction. The positive biaxial plate had an in-plane retardation of 20 nm and a thickness direction retardation Rth of −80 nm.

(Production of Polarizing Plate with Retardation Layers)

A polymer film containing polyvinyl alcohol as a main component [manufactured by KURARAY CO., LTD., trade name "9P75R (thickness: 75 µm, average polymerization degree: 2,400, saponification degree: 99.9 mol %)"] was stretched in its conveying direction at a ratio of 1.2 times while being immersed in a water bath for 1 minute. After that, the film was stretched at a ratio of 3 times with reference to a film (original length), which had not been stretched at all, in the conveying direction while being dyed by being immersed in an aqueous solution having an iodine concentration of 0.3 wt % for 1 minute. Next, the stretched film was further stretched at a ratio of up to 6 times with reference to the original length in the conveying direction while being immersed in an aqueous solution having a boric acid concentration of 4 wt % and a potassium iodide concentration of 5 wt %. The resultant was dried at 70° C. for 2 minutes to obtain a polarizer.

Meanwhile, an alumina colloid-containing adhesive was applied to one surface of a triacetylcellulose (TAC) film (manufactured by KONICA MINOLTA, INC., product name "KC4UW," thickness: 40 µm), and the resultant was laminated on one surface of the polarizer obtained in the foregoing by a roll-to-roll process so that the conveying directions of both the polarizer and the film were parallel to each other. It should be noted that the alumina colloid-containing adhesive was prepared by: dissolving 50 parts by weight of methylol melamine with respect to 100 parts by weight of a polyvinyl alcohol-based resin having an acetoacetyl group (average polymerization degree: 1,200, saponification degree: 98.5 mol %, acetoacetylation degree: 5 mol %) in pure water to prepare an aqueous solution having a solid content of 3.7 wt %; and adding 18 parts by weight of an aqueous solution containing an alumina colloid having a positive charge (average particle diameter: 15 nm) at a solid content of 10 wt % to 100 parts by weight of the resultant aqueous solution. Subsequently, a film for a first retardation layer having applied thereto the alumina colloid-containing adhesive was laminated on a surface of the polarizer opposite to the TAC film by the roll-to-roll process so that their conveying directions were parallel to each other. After that, the laminate was dried at 55° C. for 6 minutes. A film for a second retardation layer was laminated on the surface of the first retardation layer of the laminate after the drying through an acrylic pressure-sensitive adhesive (thickness: 5 µm) by the roll-to-roll process so that their conveying directions were parallel to each other. Thus, a polarizing plate with retardation layers (second retardation layer/first retardation layer/polarizer/TAC film) was obtained.

(Production of Prism Sheet)

A PET film (thickness: 100 µm) was used as a film for a base portion. A predetermined mold having arranged therein the PET film was filled with a UV-curable urethane acrylate resin as a material for a prism, and the material for a prism was cured by being irradiated with UV light. Thus, such a prism sheet as illustrated in each of FIGS. 1 and 3 was produced. The in-plane retardation Re of its base portion was 0 nm. Its unit prisms were triangular prisms, and the shape of a section of each of the unit prisms parallel to its arrangement direction and parallel to its thickness direction was a scalene triangle shape.

(Production of Optical Member)

The polarizing plate with the retardation layers obtained in the foregoing and a reflective polarizer (reflective polarizer taken out of a backlight member obtained by dismantling a 40-inch television manufactured by Sharp Corporation (product name: AQUOS, item's stock number: LC40-Z5)) were attached to each other through a light diffusion pressure-sensitive adhesive having a haze value of 80%. It should be noted that the light diffusion pressure-sensitive adhesive was prepared by compounding 25.9 parts of light-diffusible fine particles (manufactured by Momentive Performance Materials, trade name "TOSPEARL 145," particle diameter: 4.5 µm) in 100 parts of an acrylic pressure-sensitive adhesive. The polarizing plate integrated with the reflective polarizer and the reverse prism sheet obtained in the foregoing were attached to each other through an acrylic pressure-sensitive adhesive (23 µm). Thus, an optical member having such a construction "polarizing plate/light diffusion layer (light diffusion pressure-sensitive adhesive layer)/reflective polarizer/prism sheet" as illustrated in FIG. 1 was obtained. It should be noted that the integration was performed so that the ridge line direction of each unit prism of the prism sheet and the transmission axis of the polarizing plate were perpendicular to each other, and the transmission axis of the polarizing plate and the transmission axis of the reflective polarizer were parallel to each other. A distance between the light diffusion layer and prism portion in the resultant optical member was 243 µm.

(Production of Liquid Crystal Display Apparatus)

A liquid crystal display panel was taken out of a liquid crystal display apparatus of the IPS mode (manufactured by Apple Inc., trade name: "iPad2"), and an optical member such as a polarizing plate was removed from the liquid crystal display panel to take out a liquid crystal cell. Both surfaces (outside of each glass substrate) of the liquid crystal cell were cleaned for use. A commercially available polarizing plate (manufactured by Nitto Denko Corporation, product name: "CVT1764FCUHC") was attached onto the upper side of the liquid crystal cell (viewer side). Further, in order to improve visibility in viewing the liquid crystal display apparatus while wearing polarizing sunglasses, a λ/4 plate (manufactured by Kaneka Corporation, trade name: "UTZ film #140") was attached onto the polarizing plate in such a manner that its slow axis formed an angle of 45° with respect to the absorption axis of the polarizing plate. Further, the optical member obtained in the foregoing was attached as a lower side (back surface side) polarizing plate to the lower side (back surface side) of the liquid crystal cell through an acrylic pressure-sensitive adhesive. Thus, a liquid crystal display panel was obtained. At this time, the attachment was performed so that the transmission axes of the respective polarizing plates were perpendicular to each other.

Meanwhile, a backlight unit of an edge light system was produced by assembling a plurality of point sources (LED light sources), alight guide plate, and a reflective sheet according to a construction conventionally used in the industry. Such a liquid crystal display apparatus as illustrated in FIG. 4 was produced by incorporating the backlight unit in the liquid crystal display panel obtained in the foregoing. The resultant liquid crystal display apparatus was subjected to the evaluations (1) to (4). Table 1 shows the results.

Example 2

A liquid crystal display apparatus was produced in the same manner as in Example 1 except that: the thickness of the PET film for the base portion of the prism sheet was changed to 75 µm; the thickness of the reflective polarizer was changed to 35 µm; and the distance between the light diffusion layer and the prism portion was changed to 133 µm. The resultant liquid crystal display apparatus was subjected to the evaluations (1) to (4). Table 1 shows the results.

Example 3

A liquid crystal display apparatus was produced in the same manner as in Example 2 except that: the film for the base portion of the prism sheet was changed to an acrylic film having a thickness of 30 µm; the thickness of the pressure-sensitive adhesive layer between the reflective polarizer and the prism sheet was changed to 12 µm; and the distance between the light diffusion layer and the prism portion was changed to 77 µm. The resultant liquid crystal display apparatus was subjected to the evaluations (1) to (4). Table 1 shows the results.

Example 4

A liquid crystal display apparatus was produced in the same manner as in Example 2 except that the haze value of the light diffusion pressure-sensitive adhesive was changed to 85%. The resultant liquid crystal display apparatus was subjected to the evaluations (1) to (4). Table 1 shows the results.

Example 5

A liquid crystal display apparatus was produced in the same manner as in Example 2 except that the haze value of the light diffusion pressure-sensitive adhesive was changed to 60%. The resultant liquid crystal display apparatus was subjected to the evaluations (1) to (4). Table 1 shows the results.

Comparative Example 1

The polarizing plate with the retardation layers and reflective polarizer obtained in Example 1 were attached to each other through an acrylic pressure-sensitive adhesive. The polarizing plate integrated with the reflective polarizer thus obtained and the reverse prism sheet obtained in Example 2 were attached to each other through the light diffusion pressure-sensitive adhesive used in Example 1. Thus, an optical member having a construction "polarizing plate/reflective polarizer/light diffusion layer (light diffusion pressure-sensitive adhesive layer)/prism sheet" was obtained. The resultant liquid crystal display apparatus was subjected to the evaluations (1) to (4). Table 1 shows the results.

Comparative Example 2

A liquid crystal display apparatus was produced in the same manner as in Comparative Example 1 except that the haze value of the light diffusion pressure-sensitive adhesive was changed to 40%. The resultant liquid crystal display apparatus was subjected to the evaluations (1) to (4). Table 1 shows the results.

Comparative Example 3

A liquid crystal display apparatus was produced in the same manner as in Example 2 except that the polarizing plate integrated with the reflective polarizer obtained in Comparative Example 1 and the reverse prism sheet obtained in Example 2 were attached to each other through an acrylic pressure-sensitive adhesive, and the resultant was attached to the liquid crystal cell through the light diffusion pressure-sensitive adhesive used in Example 1. In other words, the liquid crystal display apparatus was produced in the same manner as in Example 2 except that an optical member having a construction "light diffusion layer (light diffusion pressure-sensitive adhesive layer)/polarizing plate/reflective polarizer/prism sheet" was used as the back surface side polarizing plate. The resultant liquid crystal display apparatus was subjected to the evaluations (1) to (4). Table 1 shows the results.

Comparative Example 4

A liquid crystal display apparatus was produced in the same manner as in Comparative Example 3 except that the reflective polarizer was not used, i.e., an optical member having a construction "light diffusion layer (light diffusion pressure-sensitive adhesive layer)/polarizing plate/prism sheet" was used as the back surface side polarizing plate. The resultant liquid crystal display apparatus was subjected to the evaluations (1) to (4). Table 1 shows the results.

Comparative Example 5

A liquid crystal display apparatus was produced in the same manner as in Comparative Example 1 except that the reflective polarizer was not used, i.e., an optical member having a construction "polarizing plate/light diffusion layer (light diffusion pressure-sensitive adhesive layer)/prism sheet" was used as the back surface side polarizing plate. The resultant liquid crystal display apparatus was subjected to the evaluations (1) to (4). Table 1 shows the results.

fying all of a moire characteristic, brightness, and a front contrast. More specifically, the liquid crystal display apparatus using the optical member of Comparative Example 1, which had the light diffusion layer between the reflective polarizer and the prism sheet, reduced in brightness. Further, as is apparent from Comparative Example 1 and Comparative Example 2, reducing the haze value of the light diffusion layer improved the brightness but made the moire remarkable. The liquid crystal display apparatus using the optical member of Comparative Example 3 having the light diffusion layer outside the polarizing plate reduced in front contrast. Further, as is apparent from Comparative Example 3 and Comparative Example 4, omitting the reflective polarizer reduced the brightness.

INDUSTRIAL APPLICABILITY

The optical member of the present invention can be suitably used as a back surface side polarizing plate for a liquid crystal display apparatus. The liquid crystal display apparatus using such optical member can be used for various applications such as portable devices including a personal

TABLE 1

| | Position of light diffusion layer | Distance between light diffusion layer and prism portion (μm) | Presence or absence of reflective polarizer | Haze value (%) | Brightness (cd/m$^2$) | Front CR | Moire |
|---|---|---|---|---|---|---|---|
| Example 1 | Between polarizing plate and reflective polarizer | 243 | Present | 80 | 486 | 1,032 | ⊚ |
| Example 2 | Between polarizing plate and reflective polarizer | 133 | Present | 80 | 482 | 1,038 | ○ |
| Example 3 | Between polarizing plate and reflective polarizer | 77 | Present | 80 | 489 | 1,025 | ○ |
| Example 4 | Between polarizing plate and reflective polarizer | 133 | Present | 85 | 471 | 1,012 | ⊚ |
| Example 5 | Between polarizing plate and reflective polarizer | 133 | Present | 60 | 513 | 1,109 | ○ |
| Comparative Example 1 | Between reflective polarizer and prism sheet | 100 | Present | 80 | 436 | 1,029 | ○ |
| Comparative Example 2 | Between reflective polarizer and prism sheet | 100 | Present | 40 | 539 | 1,137 | X |
| Comparative Example 3 | On polarizing plate | 248 | Present | 80 | 479 | 574 | ⊚ |
| Comparative Example 4 | On polarizing plate | 190 | Absent | 80 | 285 | 592 | ○ |
| Comparative Example 5 | Between polarizing plate and prism sheet | 75 | Absent | 80 | 282 | 1,031 | ○ |

<Evaluation>

As is apparent from Table 1, the liquid crystal display apparatus using the optical member of each of Examples of the present invention as its back surface side polarizing plate was suppressed in moire, and both of its front brightness and front contrast were good. Further, it was confirmed that no external appearance defect occurred in the display of the liquid crystal display apparatus of each of Examples even after a vibration test, and hence the apparatus was excellent in mechanical strength. Meanwhile, none of Comparative Examples provided a liquid crystal display apparatus satisdigital assistant (PDA), a cellular phone, a watch, a digital camera, and a portable gaming machine, OA devices including a personal computer monitor, a notebook-type personal computer, and a copying machine, electric home appliances including a video camera, a liquid crystal television set, and a microwave oven, on-board devices including a reverse monitor, a monitor for a car navigation system, and a car audio, exhibition devices including an information monitor for a commercial store, security devices including a surveillance monitor, and caring/medical devices including a caring monitor and a medical monitor.

REFERENCE SIGNS LIST 10 polarizing plate
11 polarizer
12 protective layer
13 protective layer
20 light diffusion layer
30 reflective polarizer
40 prism sheet
41 base portion
42 prism portion
100 optical member

The invention claimed is:

1. An optical member, comprising a polarizing plate, a light diffusion layer, a reflective polarizer, and a prism sheet in the stated order,
   wherein the polarizing plate, the light diffusion layer, the reflective polarizer, and the prism sheet are integrated, and the light diffusion layer is formed of a light diffusion pressure-sensitive adhesive, which comprises a pressure-sensitive adhesive as a matrix and light-diffusible fine particles dispersed in the matrix, and has a haze value of from 50% to 95% and
   wherein the polarizing plate, the reflective polarizer and the prism sheet are arranged such that a ridge line direction of unit prisms of the prism sheet and a transmission axes of the polarizing plate and the reflective polarizer form an angle of 90°±15° but excluding 90°.

2. The optical member according to claim 1, wherein the prism sheet comprises an array of a plurality of columnar unit prisms that are convex toward a side opposite to the reflective polarizer.

3. The optical member according to claim 1, wherein a distance between the light diffusion layer and a prism portion of the prism sheet is from 75 μm to 250 μm.

4. A polarizing plate set, comprising:
   the optical member according to claim 1 to be used as a back surface side polarizing plate; and
   a viewer side polarizing plate.

5. A liquid crystal display device, comprising:
   a liquid crystal cell;
   a polarizing plate arranged on a viewer side of the liquid crystal cell; and
   the optical member according to claim 1 arranged on a side of the liquid crystal cell opposite to the viewer side.

* * * * *